Figure 1:
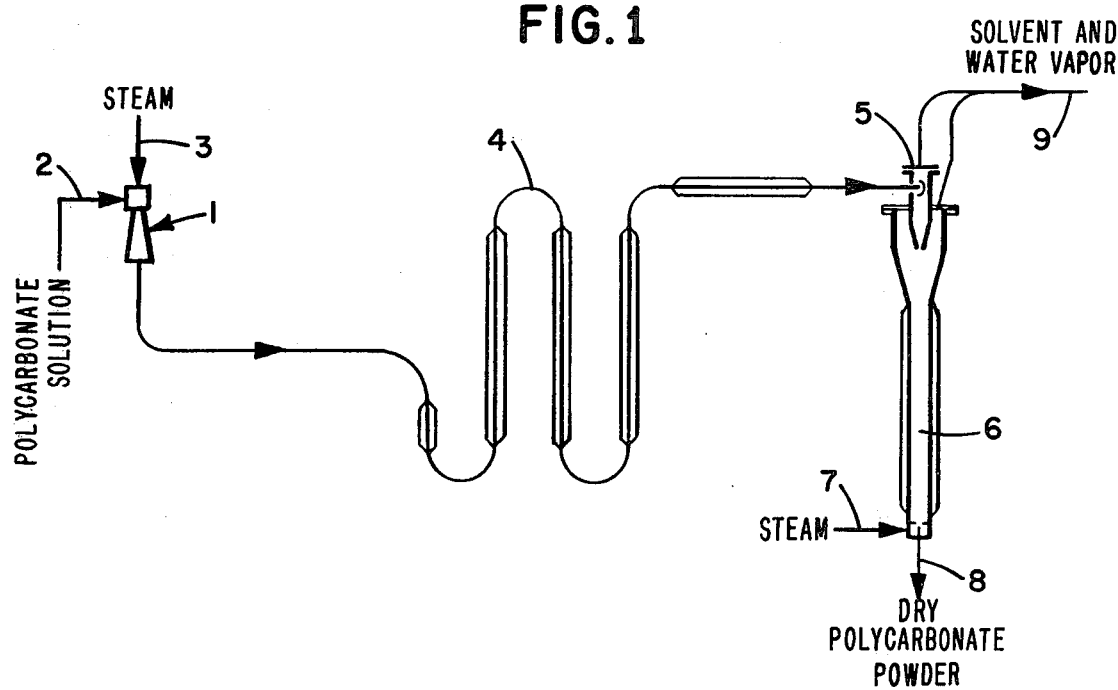
Figure 2:
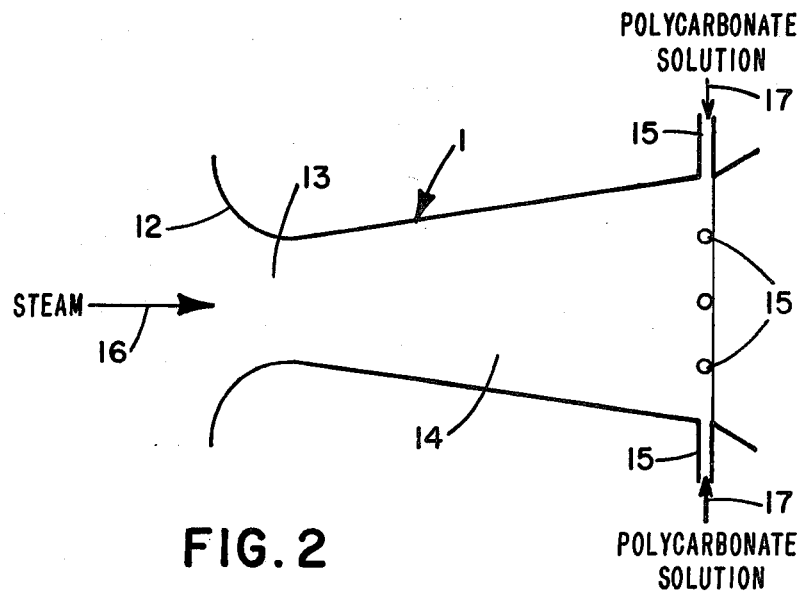
Figure 3:
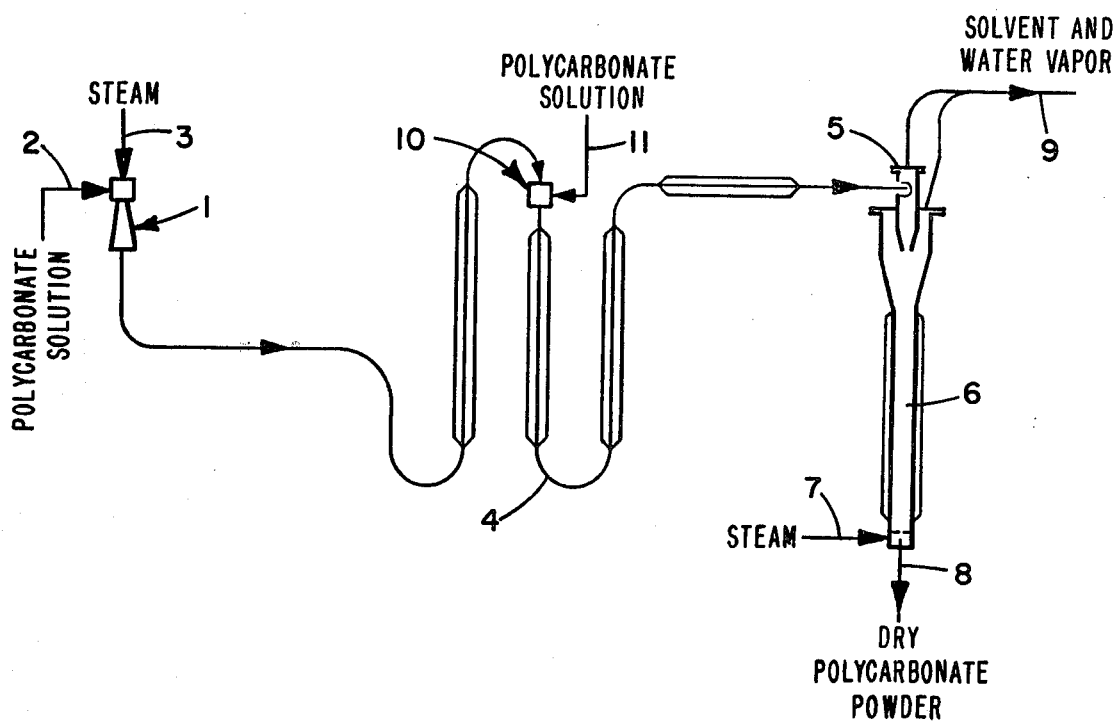
Figure 4:
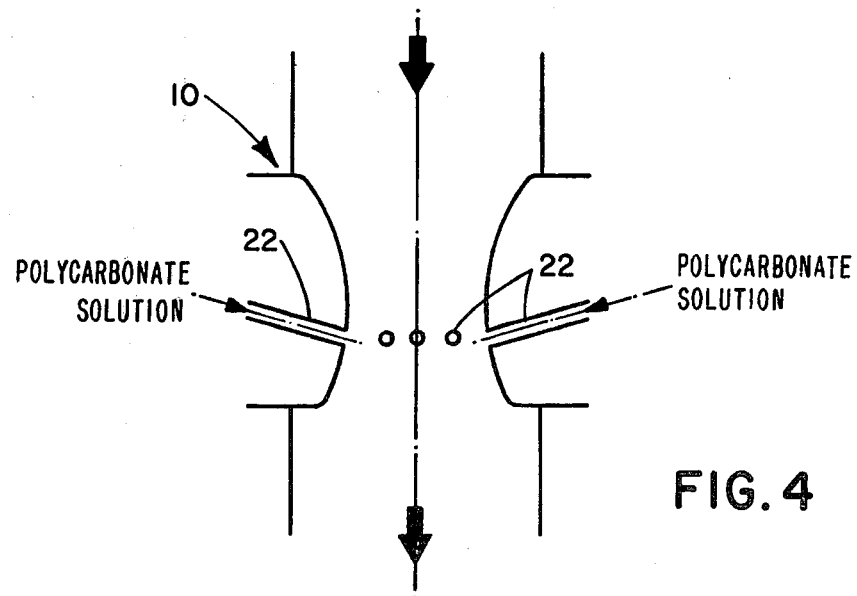

United States Patent [19]  [11]  4,212,967
Govoni et al.  [45]  Jul. 15, 1980

[54] PROCESS FOR CONTINUOUS RECOVERY OF SOLID POLYCARBONATE FROM SOLUTIONS THEREOF IN ORGANIC SOLVENTS

[75] Inventors: Gabriele Govoni, Renazzo; Giovanni Di Drusco, Milan; Canzio Corazzari, Pilastri; Pierluigi Guardigli, Ferrara, all of Italy

[73] Assignee: Montedison S.p.A., Milan, Italy

[21] Appl. No.: 14,161

[22] Filed: Feb. 22, 1979

[30] Foreign Application Priority Data

Feb. 22, 1978 [IT] Italy ............................. 20509 A/78

[51] Int. Cl.$^2$ ............................................ C08G 63/72
[52] U.S. Cl. ..................................... 528/500; 528/196
[58] Field of Search ................................ 528/500, 196

[56] References Cited

U.S. PATENT DOCUMENTS 3,505,273  4/1970  Cleveland et al. .................. 528/196

Primary Examiner—V. P. Hoke

[57] ABSTRACT

Solid polycarbonate is recovered continuously from solutions thereof in organic solvents by a process consisting of:
(a) subdividing the polycarbonate solution by steam (water vapor) at either sonic or ultra-sonic speed by means of a De Laval type nozzle;
(b) conveying the dispersion thus obtained into a tubular heat exchanger having an increasing cross-section, preferably spirally-shaped or with elbow stretches having a thermal exchange coefficient of 500–1500 Kcal/h.m$^2$ °C., in which the heat dispersion is kept at 100°–140° C. for periods of time comprised between 0.05 and 5 seconds;
(c) separating the solid from the vapors in a cyclone;
(d) drying of the solid in a water vapor fluid bed.

6 Claims, 4 Drawing Figures

PROCESS FOR CONTINUOUS RECOVERY OF SOLID POLYCARBONATE FROM SOLUTIONS THEREOF IN ORGANIC SOLVENTS

THE PRIOR ART

Numerous methods have been suggested for the separation of polycarbonate and, in general, of polymers from their solutions in organic solvents.

According to one of the methods, the polymer solution is dispersed in water and the solvent is distilled in a stream of steam. The drawbacks of this method are the high consumption of energy, due to the necessity of repeating the procedure several times in order to achieve a substantial removal of the solvent and, above all, the fact that the product obtained contains considerable quantities of water which must subsequently be removed by means of long and expensive drying processes.

Still another method, of the "spray drying" type, consists in atomizing the solution in a stream of hot inert gases, so as to facilitate the removal of the solvent. Such method requires the use of equipment having a low specific productivity and the use of great volumes of heated gases, while it results in products with a low apparent density.

A further method consists in removing the solvent by feeding a concentrated solution of polycarbonate into one or more heated apparatuses, in particular into an extruder comprising degassing zones under vacuum for the volatilized solvents. Said method involves rather high operational costs or overhead and investment expenditures for the necessary special equipment.

THE PRESENT INVENTION

An object of this invention is to provide a new and improved process for the continuous recovery of solid polycarbonate from solutions thereof in organic solvents, which method does not have the drawbacks and disadvantages of the methods of the prior art.

Another object is to provide a method in which the solvent is removed with low consumption of steam, thereby achieving a very high productivity in equipment of very limited dimensions.

Another object of this invention is the obtaining of solid polycarbonate of a high apparent density, substantially free of organic solvent and with a low moisture content.

A further object is the obtaining of polycarbonate particles having a controlled morphology and a controlled granulometry, and which may be used directly in extrusion equipment.

Still another object is that of avoiding, during the separation of polycarbonate, the degrading phenomena and modifications of the qualities peculiar to the polycarbonate itself, such as the transparency, thermal stability, and color.

The aforesaid objects and others are achieved by means of a continuous process consisting of the following phases:

(a) feeding the solution of polycarbonate in organic solvents, at a temperature comprised between 0° and 120° C., through one or more feeding ducts in the restricted zone or in the diverging stretch of a De Laval type nozzle run through by water vapor at respectively sonic or ultrasonic speed, while maintaining feeding ratios steam/polycarbonate solution of 1–5 kg of vapor per kg of solution, and in which the solution is subdivided by the vapor thereby forming a dispersion of minute particles of solution in the vapor; and (b) continuous feed of the resulting dispersion of phase (a) to one of the heat exchangers of the pipe-in-pipe type directly connected to the diverging stretch of the nozzle, said exchanger having a mean thermal exchange coefficient of 500–1500 Kcal/hr. cu.mt.°C. and an increasing cross-section along its way, and in which the dispersion, maintained at between 100° and 140° C. for dwelling times between 0.05 and 5 seconds, has a velocity of at least 90 mt/sec. in the initial tract and between 10–50 mt/sec. in its final tract and wherein there is obtained a dispersion of minute solid particles of polycarbonate dispersed in the vapor phase consisting of solvent and water steam.

The polycarbonate powder is then separated from the vapor of the resulting dispersion of phase (b) according to any known method, for instance using a cyclone.

According to the present process there may be conveniently used solutions having a concentration in polycarbonate of up to 30% by weight.

Solutions with a low concentration of polycarbonate of high molecular weight, such as are directly obtained according to known synthesis processes carried out in the presence of a solvent of the polymer, are particularly suitable for use in the practice of this invention.

An example of such solutions are the solutions obtained by interfacial polycondensation of bisphenol-A, preferably using methylene chloride as solvent and in general containing up to 20% by weight of polycarbonate.

It is also possible to feed polycarbonate solutions containing, in a dispersion, mineral fillers and/or inorganic pigments such as, for instance, glass fibers, asbestos, mica and metal oxides. In this case, the powders or the particles of polycarbonate thus obtained contain the above-mentioned fillers in a state of homogeneous dipsersion, with the advantage that thereby are avoided subsidiary operations of homogenization before granulation as, on the contrary, are required in the techniques of the prior art whenever such fillers are added to the polymer powder.

In the exchanger of phase (b) there takes place the solidification of the polycarbonate which latter separates from the solvent in the form of particles whose morphology and apparent density may be controlled by controlling the operating conditions indicated both for phase (a) and for phase (b) which are tightly connected with each other.

More particularly, it has been observed that if the heat exchanger preferably has a spiral-like course or if it is of the rectilinear type alternated by at least five curved stretches with a curvature ratio, related to the diameter of the spiral of 10—20, there will be obtained a much more accurate control of the morphology of the product and the best results as far as the removal of the solvent, the granulometric distribution and the apparent density of the polycarbonate particles are concerned.

The process may also be carried out with a heat exchanger consisting of a rectilinear tube or pipe.

It is also possible to feed the solution of polycarbonate in several successive points of the course of the heat exchanger pipe of phase (b), through DeLaval-type nozzles inserted in said heat exchanger and through which, in this case, will flow through the dispersion resulting from phase (a).

In this way, exploiting the thermal content and the kinetic energy present in the heat exchanger after a first separation has occurred and the solidification of the polycarbonate particles has taken place, it is possible to separate and solidfy further polymer with the advantage of further reducing the specific consumption of steam.

The particles of polycarbonate that form at the beginning of phase (b) of this process, rapidly attain a sufficiently solid consistency and do not suffer any morphological modifications when, during flow thereof through the heat exchanger they meet further polycarbonate solution introduced into the heat exchanger successively.

Consequently, with the said feeding in at several points, a product in the form of powders or particles with characteristics similar to those obtained by means of one single feeding of polymer solution is obtained, but with the advantage of being able to operate with steam/solution ratios that may attain even up to 1/7 kg/kg.

The particles or powder of the polycarbonate obtained after separation of the vapor phase still contain traces of solvent, which traces may be removed successively according to a method, and this represents a further aspect of this invention, which consists in conveying those particles into a drying apparatus operating on a fluid bed fed with overheated water vapor, with short dwelling times.

By the present process it is possible to obtain polycarbonate powders or particles having an apparent density comprised between 0.2 and 0.4 kg/cu.dm, a resting angle below 40°, and being free of organic solvent (less than 10 ppm) and a moisture level generally below 0.5% by weight.

The possibility to obtain polycarbonate powders having the above said characteristics is of considerable importance inasmuch as said powders may be directly fed into standard extrusion equipment for the subsequent granulation phase, without encountering, for instance, phenomena of clogging or pulsing, thus achieving regularity in the running of the extrusion equipment, with a consequential increase of the hourly output.

It must be noted that all the phases and operational conditions of this process are closely integrated with each other in order to obtain an effective and economical recovery of the polycarbonate as well as for obtaining polycarbonate powders having the above indicated characteristics.

Moreover, the drying of the polymer in a fluid bed by means of overheated water vapor gives excellent results just because of the fact that one operates on polycarbonate powders having the morphological characteristics that result from having carried out the previous phases (a) and (b).

In fact, if the polycarbonate powder is prepared by methods different from those of this invention, it is not possible to remove the solvent in a sufficiently effective way on the fluid bed by simply using overheated water vapor.

The use of overheated water vapor according to the present invention, instead of hot inert gases, results, on the other hand, in a considerable further saving of energy.

The equipment used for realizing this process is of very limited dimensions and thus proves to be very compact, simple and flexible for the handling, and in which the separation of the polycarbonate powder takes place in a continuous cycle, with operational times that are very short and with a low consumption of energy, in particular of steam, thereby achieving conditions of high productivity in a very economical way.

Suitable apparatus or equipment useful in practicing this invention is shown in the accompanying drawings, in which FIG. I is an overall showing of the apparatus;
FIG. II shows a nozzle of suitable type;
FIG. III illustrates a modified apparatus; and
FIG. IV shows a type of nozzle suitable for insertion into the heat exchanger of the modified apparatus of FIG. III involving a plurality of feeding points for the polycarbonate solution.

Referring to the drawings, 1 in FIG. I is a nozzle to which the polycarbonate solution is fed in the direction of the arrow 2 and to which the overheated water vapor is fed in the direction of the arrow 3; 4 is a heat exchanger through which runs the dispersion obtained at the outlet of the nozzle; 5 is a cyclone which receives the dispersion flowing out of the exchanger; 6 is a fluid bed fed from above with the polycarbonate powder separated in the cyclone, and from below with the overheated vapor in the direction of arrow 7. FIG. I also shows the outflow, in the direction of arrow 8, of the dried polycarbonate powder and the outlets for the solvent vapors and the water vapor according to arrow 9.

In FIG. II, 1 is the nozzle of suitable type through which the water vapor runs in the direction of arrow 6; the converging zone 2, the narrowed 3 and the diverging zone 4 of said nozzle into which lead the feeding ducts 5 for feeding the polycarbonate solution in the direction of arrow 7.

FIG. III illustrates equipment for the practical embodiment of this process, which, with respect to the one illustrated in FIG. I, comprises a variant by which, into the heat exchanger tube, there has been inserted a nozzle 10 of the DeLaval-type into which is fed, in the direction of the arrow 11, a further quantity of polycarbonate solution that thus joins the flow of the dispersion, obtained in phase (a), which flows through the nozzle longitudinally.

FIG. IV represents a type of nozzle to be inserted into the heat exchanger in the case of a plurality of feeding points for the polycarbonate solution according to the variant illustrated in FIG. III. This nozzle comprises ducts or channels 12 for the feeding of further quantities of polymer solution.

The following examples are given to illustrate the invention in more detail and are not intended to be limiting.

EXAMPLE 1

With reference to FIG. I of the drawings, to nozzle 1 were simultaneously fed:

in the direction of arrow 3, 100 kg/hr of water vapor, at a pressure of 14 kg/sq.cm and at a temperature of 200° C., and, in the direction of arrow 2, in particular in the diverging stretch of the DeLaval nozzle, 200 kg/hr of polycarbonate solution at 25° C., consisting of 12% by weight of polycarbonate obtained by interfacial condensation of bisphenol-A having an inherent viscosity of 0.52 (determined at 30° C. in paradioxane at a concentration of 0.5 g/100 cc), and 88% by weight of methylene chloride.

The thus obtained dispersion passed directly into the heat exchanger 4, which consisted of a sleeved spiralling tube with a spiral diameter growing from ⅜ of an inch to 1 inch, and realized with three cross-section increments. The exchange surface of the spiral amounts of 0.3 m². The temperature of the fluid running in the sleeve is 170° C.

The dispersion, in the first stretch of heat exchanger, has a temperature of 108° C. and a flow rate of 120 m/sec. while in the last stretch of the exchanger the temperature equals 125° C. while the flow rate is 30 m/sec. The total dwell time of the dispersion in the heat exchanger amounts to 0.15 seconds.

At the outflow from the exchanger, the dispersion flows into cyclone 5 where the vapors separate at a temperature of 125° C. from the polycarbonate which gathers at the base of the cyclone in the form of solid particles having a humidity content of 5% by weight and a residual content of methylene chloride of 1% by weight.

For the above described operational conditions there was calculated a thermal exchange coefficient of the spiral tube of 1000 Kcal/hr.m²°C.

The polycarbonate particles, separated at the base of the cyclone, were then conveyed into the fluid bed dryer 6 where the overheated vapor fed in the direction of arrow 7 met them in countercurrent.

The particulated polycarbonate that is obtained at the outlet 8 of the dryer has a moisture content of 0.3% by weight, a residual content in methylene chloride below 10 ppm. an apparent density of 0.35 kg/cu.dm, a granulometric range of the particles comprised between 300 μ and 3 mm and a resting angle of 36°.

EXAMPLE 2

With reference to FIG. I, nozzle 1 was contemporaneously fed with:
in the direction of arrow 3, 140 kg/hr of water vapor at a pressure of 14 kg/sq.cm and at a temperture of 200° C., and
in the direction of arrow 2, in particular in the diverging stretch of the DeLaval nozzle, 700 kg/hr of polycarbonate solution at a temperature of 20° C., consisting of 12% by weight of polycarbonate obtained by interfacial polycondensation of bisphenol-A and having an inherent viscosity of 0.52 (in paradioxane at 30° C. and at a concentration of 0.5 g per 100 cc), and 88% by weight of methylene chloride.

The dispersion obtained at the outlet of the nozzle was directly conveyed into the tubular heat exchanger 4 consisting of stretches of sleeved pipes alternated by 5 elbow connections, at 180° C. The diameter of the pipe or tube increases from ⅜ inch to, respectively, 1, 1.5 and 2 inch with 3 cross-section increases.

The heat exchanging surface of the tube amounted to 1.8 sq.mt. The temperature of the fluid in the sleeve was 170° C. In the first stretch of the heat exchanger the dispersion had a temperature of 110° C. and a flow rate of 100 mt/sec., while in the final stretch of the exchanger the temperature was 135° C. and had a flow rate of 40 mt/sec. The total dwell time of the dispersion in the exchanger amounted to 0.35 seconds.

At the outlet of the exchanger the dispersion passed into a cyclone 5 where at 135° C. there separated a vapor phase and at the base of the cyclone there separated a solid phase consisting of solid polycarbonate particles with a moisture content of 15% by weight and a residual methylene chloride content of 1.5% by weight.

Under the above-described operating conditions there was calculated a thermal exchanger coefficient for the tubular heat exchanger of 500 Kcal/hr.sq.mt°C.

The polycarbonate particles separated at the base of the cyclone were then conveyed into the fluid bed dryer 6 fed with overheated vapor coming from 7.

The particulate polycarbonate that was obtained at the outlet 8 of the dryer has a moisture content of 0.5% by weight, a residual methylene chloride content of less than 10 ppm, an apparent density of 0.25 kg/cu.dm, a granulometric distribution of the particles comprised between 1 and 6 mm and had a rest angle of 40°.

EXAMPLE 3

With reference to FIG. III, the nozzle 1 were simultaneously fed:
in the direction of arrow 3, 140 kg/h of water vapor at a temperature of 200° C.; and
in the direction of arrow 2, and in particular in the diverging tract of the DeLaval nozzle, 600 kg/h of solution containing 12% by weight of polycarbonate obtained as in Examples 1 and 2, and at a temperature of 20° C.

The dispersion thus obtained passed directly into the heat exchanger tube 4 described in Example 2.

Further solution of polycarbonate was fed through nozzle 10 at a feed rate of 350 kg/h.

The speed of the suspension in the relief of the nozzle 10 amounted to 140 m/sec. The temperature in the end section of the heat exchanger was 130° C. while the temperature inside the sleeve amounted to 170° C., throughout the heat exchanger.

The polycarbonate particles separated at the base of the cyclone 5, flowed into the fluid bed dryer fed with overheated steam coming from 7.

The solid polycarbonate particles that are obtained have a moisture content of 0.5% by weight, a residual content in methylene chloride of less than 10 ppm, an apparent density of 0.25 kg/cu.dm. The granulometric size distribution of the particles is comprised between 1 and 6 mm and the resting angle equals 40 °.

Although reference is made herein to a nozzle of the DeLaval type, it is obvious that the process of this invention is not restricted, in practice, to apparatus including such nozzle.

We claim:
1. A continuous process for the recovery of polycarbonates from solutions thereof in organic solvents, said process consisting of the following phases:
(a) feeding of the polycarbonate solution at a temperature comprised between 0° and 120° C., through one or more feeding ducts into the narrow zone or the diverging stretch of a DeLaval-type nozzle run through by water vapor at respectively sonic or ultrasonic speed, maintaining feeding ratios vapor/polycarbonate solution comprised between 1 and 5 kg of vapor per kg of solution, with formation of a dispersion of particles of polycarbonate in the vapor;
(b) continuous feeding of the dispersion resulting from phase (a) to a pipe-in-pipe heat exchanger, directly connected to the diverging stretch of the nozzle, said heat exchanger having a mean thermal exchange coefficient comprised between 500 and

1500 Kcal/hr.sq.mt°C., and a cross-section growing along its development, and in which exchanger the dispersion, maintained at 100°–140° C. for dwell times comprised between 0.05 and 5 seconds, has a flow rate of at least 90 mt/sec. in the initial stretch and from 10 to 50 mt/sec. in its final stretch; thereby obtaining solid minute polycarbonate particles dispersed in the vapor phase consisting of the vapors of the solvent and of water vapor, and separating the solid polycarbonate particles from the vapors.

2. The process of claim 1, in which the starting polycarbonate solution contains dispersed mineral and/or pigment fillers.

3. The process of claim 1 in which the heat exchanger of the pipe-in-pipe type develops a course of the spiral type or of the rectilinear type alternated by at least five curved stretches having a curvature ratio, referred to the diameter of the spiral, of 10–20.

4. The process of claim 1 in which the separation of the polycarbonate particles from the vapors is carried out in a cyclone.

5. The process of claim 1, in which the polycarbonate particles obtained after separation from the vapor phase, are fed to a drying unit using a fluid bed fed with overheated water vapor.

6. The process of claim 1, in which further quantities of polycarbonate solution are fed into the heat exchanger simultaneously with the dispersion, through one or more DeLaval-type nozzles inserted in one or more points of the course of said heat exchanger.

* * * * *